March 30, 1965 L. H. PETERS ETAL 3,176,057
MOLDING PROCESS
Filed Jan. 23, 1963
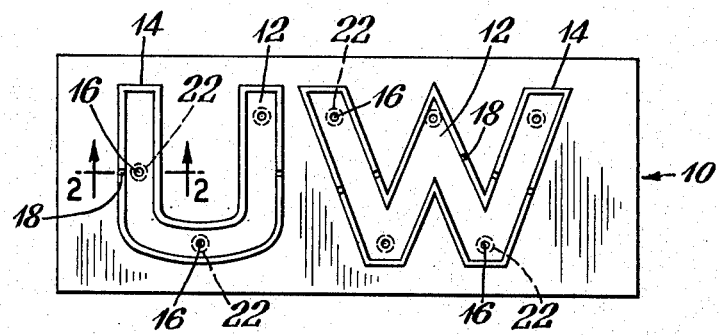
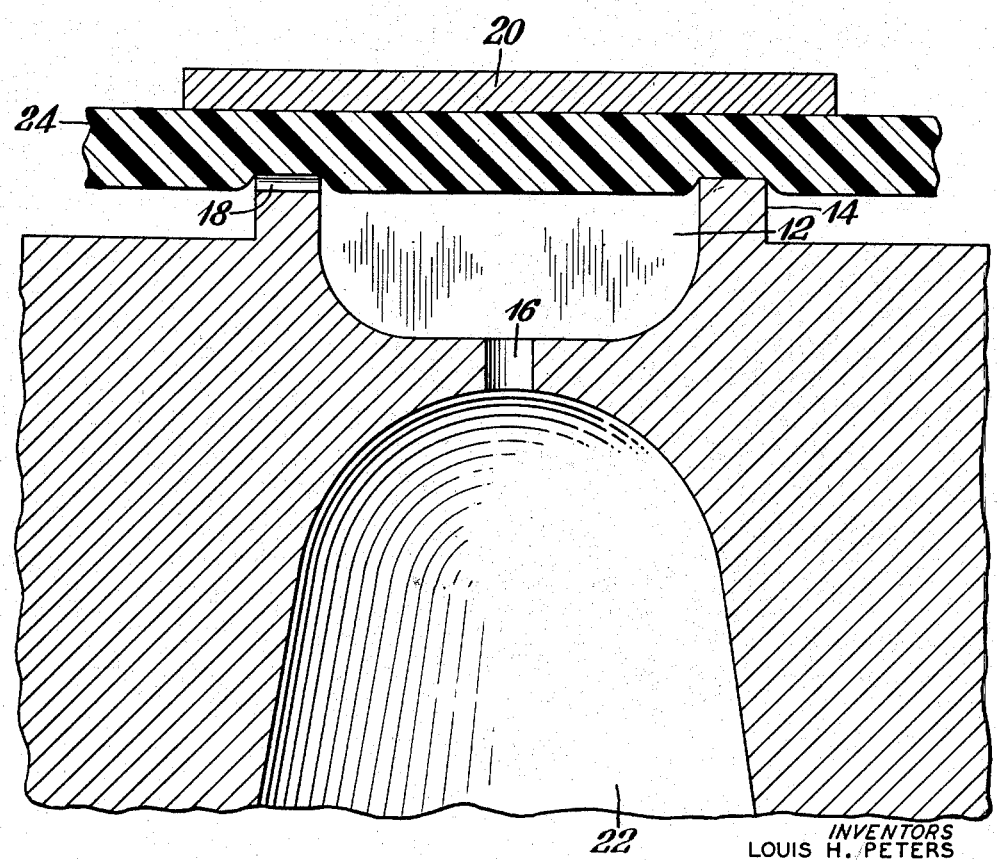
INVENTORS
LOUIS H. PETERS
HAROLD S. CLOYD
RICHARD W. WELCH
ROBERT T. MANGOLD
BY Richard G. Miller
ATTORNEY

ன்

3,176,057
MOLDING PROCESS
Louis H. Peters, Somerville, N.J., and Harold S. Cloyd, Erie, Richard W. Welch, Lake City, and Robert T. Mangold, Erie, Pa., assignors to Union Carbide Corporation, a corporation of New York
Filed Jan. 23, 1963, Ser. No. 253,494
5 Claims. (Cl. 264—266)

This invention relates in general to a novel process for forming laminate articles and more particularly to a molding process for applying and adhering to a thermoplastic substrate decorative or functional applique of the same or different thermoplastic material.

There has over the period of the past several years been an extremely rapid growth in the use of thermoplastic resins such as polyethylene, polypropylene, polystyrene, polycarbonates, and polyamides, in the fabrication of articles of commerce formerly made of wood, metal, glass, paper, and the like. Particularly in the area of packaging has this growth been manifest. For example, plastic squeeze bottles, toys, furniture, disposable eating utensils, and shipping cartons for beverages are all finding increasing consumer markets in substantial displacement of the same articles previously made from more expensive materials.

With many of these plastic articles it has been found to be essential for commercial usage that the same decorative, descriptive or advertising matter be permanently attached thereto as had become conventional with wood, metal, paper etc. articles of the same kind. Thus, perhaps one of the most serious problems to be solved is that of how inexpensively to apply to a thermoplastic substrate single or multicolor applique, often in intricate design detail, to be both esthetically pleasing and yet adequately bonded and rugged to withstand the rigors of rough handling in transport, long term storage in diverse environments, and the like.

Unlike wood, metal or paper, most thermoplastic materials exhibit a relatively low affinity for dissimilar materials such as ink, conventional sticking pastes and glues, and even toward the same or other thermoplastic materials unless the temperature of one or both surfaces to be adhered is raised to a point which also can cause dimensional distortion, color impairment or intermingling, i.e. smearing.

Consequently, a wide variety of techniques have been proposed to create an applique lamination of thermoplastic on thermoplastics. For example, intaglio molds have been proposed in which the applique material is first introduced into the design cavities and then the substrate material applied over the entire mold surface. It has also been proposed to preform the applique design by stamping same from a plastic sheet and thereafter pressing the design onto the substrate, either or both of which has been brought to a heat softened state. Numerous adhesives have also been suggested for bonding the materials.

Each of these prior known techniques has been found to possess significant disadvantages, either from the standpoint of cost of fabrication, from the aspect of durability, or arising from a lack of adequate versatility. Articles such as beverage cases, for example, which must withstand repeated use in the shipping of bottles and cans, and in which the applique design is applied with an adhesive have been found to have a prohibitively short use period before deterioration and loss of decoration occurs. Particularly where the applique is composed of two or more colored plastics, thermoforming techniques have proved incapable of preventing mixing of the colors at the interface of the two colored materials with resultant adverse affect on appearance.

It is therefore a general object of the present invention to provide a molding process for forming single or multicolor decorative and/or functional thermoplastic applique laminates on a substrate which avoids the disadvantages of prior known methods.

It is a more particular object to provide a molding process for applying multicolor thermoplastic applique to a thermoplastic substrate which results in a firmly bonded laminate and in which the color interfaces are well defined.

These and other objects which will be obvious from the specification and the appended claims are accomplished in accordance with the process of this invention which comprises forming a mold cavity by pressing a substrate upon which an applique laminate is to be applied into intimate contact with an intaglio mold having projecting lands defining the boundaries of the applique design, the substrate being of a yieldable, i.e. pressure deformable material and being applied against the lands of the said intaglio mold with sufficient pressure that the said lands inwardly deform the substrate along the area of contact, and thereafter injecting a cavity-filling quantity comprised of at least one molten thermoplastic material into the mold cavity thus formed through at least one small bore channel communicating the said mold cavity with the exterior face of the intaglio mold, cooling the molten plastic to solid form, and thereafter removing the intaglio mold from contact with the substrate, whereby the applique design remains adhered to said substrate.

The process can be more readily understood by reference to the drawings in which FIG. 1 is an intaglio mold plate such as is suitably employed in the present process;

FIG. 2 is a fragmentary and greatly magnified cross-sectional view of the mold plate of FIG. 1 taken along line 2—2.

Considering first FIG. 1, the mold comprises a rigid, heat resistant base plate 10 having one or more concave areas 12 each of which is defined by a land 14 integral with base plate 10 and raised sufficiently above the surface of the base plate to permit the lands to contact and deform inwardly the plastic substrate against which the mold is applied. Communicating from each cavity area 12 to the reverse surface of the base plate are one or a plurality of very small diameter passages 16 through which molten plastic is passed from the reverse side of the base plate to fill the cavities defined by the land 14, the plastic substrate against which the lands bear, and the concave area 12 when the molding process is in operation. To permit the escape of entrapped air in the mold cavities and thus insure complete filling thereof by the molten plastic a number of minute grooves 18 are advantageously made in the upper face of the land 14 which are sufficiently small to permit the passage of air but prevent the escape of the molten plastic material which forms the applique design. Other means of removing entrapped air will of course be obvious to those skilled in the art, such as for example providing a porous section in the mold cavity which allows the escape of air through the land 14 or through the base plate 10.

In FIG. 2, a small cross-section taken along line 2—2 of the mold shown in FIG. 1 is shown greatly magnified and applied against a substrate. The elevation of lands 14 above the surface of base plate 10 is not narrowly critical, but in order that an adequate seal between the substrate 24 and the mold cavity 12 it has been found that a land height of at least about 0.001 inch and preferably about 0.020 inch is most desirable. As will be obvious to those skilled in the art, there is no theoretical maximum height for the lands, but strength of materials limitations with respect to the mold must be considered in determining a practical maximum. Under the ideal conditions moreover, where both the substrate and the bearing surface of the lands are perfected mated, i.e. optically flat in the simplest embodiment, no lands at all would be required, but such conditions are not encountered in actual practice. On the other hand it is also practical to employ a substrate having preformed lands which bear against the base plate 10 to form a seal. In such an embodiment the base plate need not have lands, but can also possess lands if desired. To urge the mold and substrate into firm contact a backup plate 20 is advantageously used.

Similarly, the proportions and dimensions of the cavity 12 are not at all critical. Theoretically any desired thickness of applique can be formed, although with extremely thin appliques placed on a cold substrate care must be exercised to provide adequate heat to the molten plastics to produce a firm bond between the applique and the substrate. It has also been found advantageous to provide somewhat rounded corners at the bottom of the mold cavity so that the applique on the finished product can better deflect sharp blow to the sides thereof which might accidentally occur in using the product.

Further, in FIG. 2 the molten plastic is introduced into mold cavity 12 through channel 16 which is, primarily for reasons of appearance of the finished product, as small in diameter and length and is practical in view of the viscosity of the molten polymer being forced therethrough. It has been found with polyethylene, for example, that a diameter and a length of about 0.015 inch is a practical minimum. The larger channel 22 provides an unrestricted flow of molten plastic to the mold cavity from an external source such as a conventional injection molding or extrusion apparatus. Advantageously a conventional three-plate mold is utilized in which the nozzle of an injection molding apparatus is fitted through the second and third plates of the mold and a runner system connecting all channels 22 in the first plate (a portion of which is shown in FIG. 2) is defined by the abutting surface of the first and second plates. Sprue removal is provided for by a plurality of pins, each fastened at one end in the third plate, extending through the second plate and each having the other end positioned within one of each of the channels 22 shown in FIG. 2. Upon completion of the molding operation, the withdrawal of the first plate removes the sprues and plastic material which has solidified in the runner system from the first plate, and the withdrawal of the second plate removes the solid sprue system from the pins, thus cleaning the mold for the next molding operation.

Because of the considerable pressures involved in forcing the molten plastic through the very small channels 16, i.e. the order of 300 to 750 p.s.i. using a 64 square inch piston in the injection molding apparatus, it is highly advantageous to provide the substrate upon which the applique is to be applied with a rigid backing member, particularly for the areas to be contacted by the molten plastic which is to form the applique design.

The temperature of the substrate and of the molten applique material are not critical factors and depend in the main upon the particular thermoplastic material employed in each case. In general, the substrate can be at, initially at least, at ambient room temperature, i.e. no heating or cooling is necessary. The applique design forming material must of course be sufficient to be in the molten state and also to pass through mold channels with relative ease. For optimum adhesion of the applique, the temperature of the molten plastic applied to the substrate must also be sufficiently hot to soften the substrate material in the desired local areas in order that a fused union results. For high density polyethylene (0.96, melt index=2.3) temperatures of from about 520° F. to about 570° F. for the applique material have been found to be highly satisfactory.

Any of the well known synthetic thermoplastic resins which can be injection molded can be employed as the substrate or the design material. Illustrative are poly-(ethylene-ethylacrylate) copolymers, particularly those containing from 2 to 40 percent ethylacrylate, polyethylene, polypropylene, polystyrene, poly (α-methylstyrene), poly(vinyl chloride), poly(methylmethacrylate), polyacrylonitrile, poly(vinyl acetate), poly(hydroxyethers), polyoxymethylene, polybutadiene, cis-polyisoprene, polydimethylbutadiene, polyvinylformal, polyvinyl acetal, (vinyl chloride-acrylonitrile) copolymers, polyvinylidene chloride, polyethylmethacrylate, poly-n-propylmethacrylate, polycarbonates such as those prepared by reaction of a bisphenol with phosgene, poly-α-vinylnaphthalene, poly-α-vinylpyridine, polymethylacrylate, (vinylidene chloride-vinyl acetate) copolymers, polyvinylbutyral, polydichlorostyrene, polyurethanes, and the like. Preferably, however, the substrate and the design material are of the same resin or at least are of resins which are mutually compatible, i.e. will form a one phase system upon being melted and admixed. Polyethylene, especially polyethylene having a density greater than about 0.94 is particularly preferred for both the substrate and design material.

The resins employed can also contain conventional additives such as pigments, lubricants, plasticizers, fillers, antioxidants and the like.

The following example is typical of the present process, but is not intended to be limitative thereof.

*Example 1*

Using a conventional injection molding apparatus in combination with a conventional three plate mold, the first plate of which had the configuration substantially as shown in FIGS. 1 and 2 of the drawings, a plastic case for holding 24 soft drink bottles was decorated with an applique design on one of the side panels. The beverage case had previously been formed from polyethylene having a density of about 0.96 and a melt index of from 2 to 3. The side panel of the beverage case which served as the substrate for the applique design was substantially planar and was approximately 22 inches long, 4 inches wide, and had a thickness of about ⅛ inch. To prepare the side panel for contact with molten polyethylene of the same density and average molecular weight, the panel was firmly pressed between a metal back-up block and the first plate of the three-plate mold, a force of about 35 tons being used to urge the substrate surface into compliance with the lands of the mold. Using a pressure of about 500 p.s.i., molten high density polyethylene at a temperature of about 520° F. was forced through the injection molding apparatus orifice, through the runner system of the three-plate mold and into the cavities formed between the substrate surface and the area of the first plate of the mold defined by the lands thereon. Entrapped air was forced out through a plurality of tiny grooves on the surface of the lands in contact with the substrate, by the incoming molten plastic which completely filled the mold cavity. The molten polymer became fused with the surface portion of the polyethylene substrate over the area of contact, and after cooling to permit the molten polymer to solidify the three-plate mold was withdrawn, leaving the finished article.

Waht is claimed is:

1. The process for applying a thermoplastic applique design to substrate which comprises forming a mold cavity by pressing together into intimate contact a substrate and a mold plate having an intaglio design therein and having projecting lands defining the boundaries of said intaglio design, the substrate being of a pressure deformable material and being impressed against the lands of said intaglio mold with sufficient pressure that the lands inwardly deform the surface of the substrate along the area of contact, and thereafter injecting a cavity-filling quantity comprised of at least one molten thermoplastic material into the mold cavity thus formed through at least one small bore channel communicating the said mold cavity with the exterior face of the intaglio mold plate, cooling to a solidification temperature the molten thermoplastic in contact with the substrate, and thereafter removing the mold plate from contact with the substrate, whereby the applique design remains adhered to said substrate.

2. The process according to claim 1 wherein the pressure deformable substrate material is a normally solid synthetic thermoplastic resin.

3. The process according to claim 2 wherein both the substrate and the thermoplastic material forming the applique design thereon are normally solid polyethylene.

4. The process according to claim 3 wherein the temperature of the molten polyethylene forming the applique design as it is applied against the substrate is at least as high as the melting point of the polyethylene polymer substrate.

5. The process according to claim 3 wherein the temperature of the molten polyethylene forming the applique design as it is applied against the substrate is from about 520° F. to about 570° F.

References Cited in the file of this patent
UNITED STATES PATENTS

| | | |
|---|---|---|
| 2,298,365 | Gits et al. | Oct. 13, 1942 |
| 2,765,494 | Weingart | Oct. 9, 1951 |
| 2,766,484 | Sanderson | Oct. 16, 1956 |
| 2,811,744 | Baldanza | Nov. 5, 1957 |
| 2,937,409 | Cole | May 24, 1960 |
| 2,956,313 | Choice | Oct. 18, 1960 |
| 3,122,598 | Berger | Feb. 25, 1964 |

OTHER REFERENCES

Ser. No. 285,944, Swarovski (A.P.C.), published Apr. 27, 1943.